United States Patent [19]

Sauer

[11] Patent Number: 4,969,668
[45] Date of Patent: Nov. 13, 1990

[54] HOSE COUPLING

[75] Inventor: Heinz Sauer, Ronneburg, Fed. Rep. of Germany

[73] Assignee: Rasmussen GmbH, Maintal, Fed. Rep. of Germany

[21] Appl. No.: 345,635

[22] Filed: May 1, 1989

[30] Foreign Application Priority Data

May 4, 1988 [DE] Fed. Rep. of Germany ....... 3815167

[51] Int. Cl.$^5$ .............................................. F16L 33/20
[52] U.S. Cl. .................................... 285/256; 285/319; 285/921
[58] Field of Search ............... 285/921, 256, 319, 242, 285/257

[56] References Cited

U.S. PATENT DOCUMENTS 4,063,760 12/1977 Moreiras .......................... 285/921 X
4,453,746 6/1984 Keenan ................................ 285/256
4,486,034 12/1984 Sauer .................................. 285/319 X Primary Examiner—Dave W. Arola
Attorney, Agent, or Firm—Peter K. Kontler

[57] ABSTRACT

A metallic or plastic nipple which has an annular external recess adjacent a circumferentially complete annular retaining rib can be separably connected to an end portion of a flexible hose by a coupling employing a sleeve having a tubular section which is receivable in the end portion of the hose. The sleeve is further provided with a set of elastic prongs which slope toward the axis of the sleeve and extend into the recess adjacent the retaining rib when the nipple is inserted into the sleeve. A permanently deformable or repeatedly expansible and contractible discrete clamping member is applied around the end portion of the hose to maintain such end portion in sealing engagement with the tubular section of the sleeve. The prongs can be integral with the tubular section or with a second section of the sleeve. The second section is form-lockingly or otherwise affixed to the tubular section. The inner diameter of that portion of the tubular section which is introduced into the hose is at least slightly larger than the maximum diameter of the retaining rib. One or more O-rings or otherwise configurated annular sealing elements are interposed between the sleeve and the nipple.

20 Claims, 2 Drawing Sheets

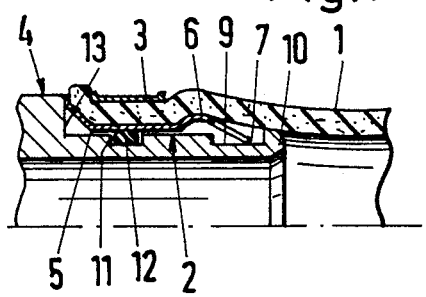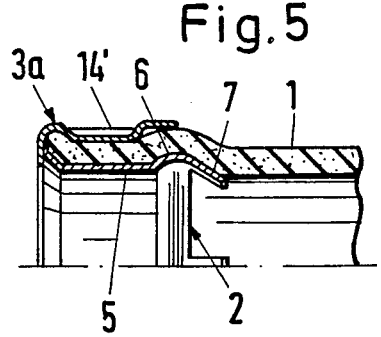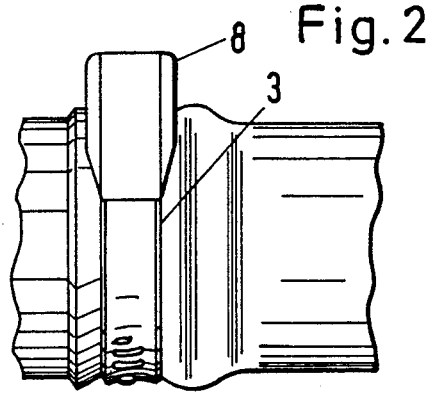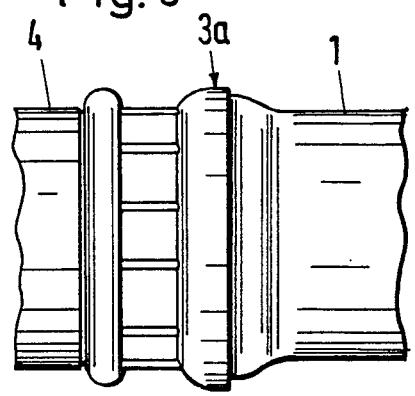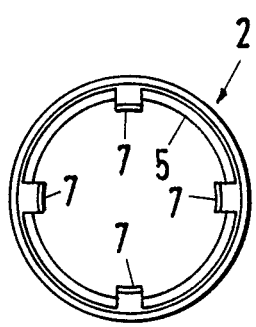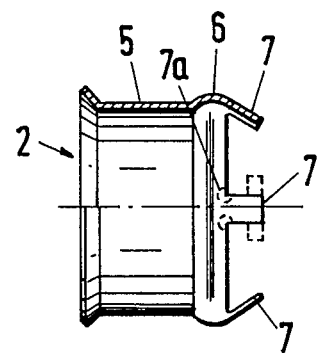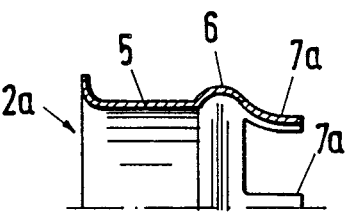

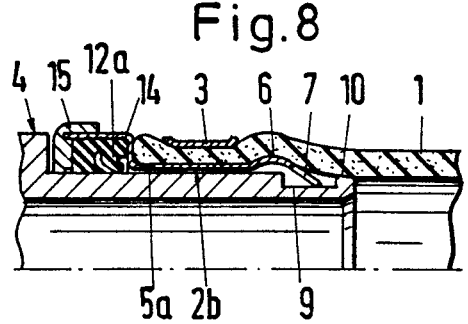
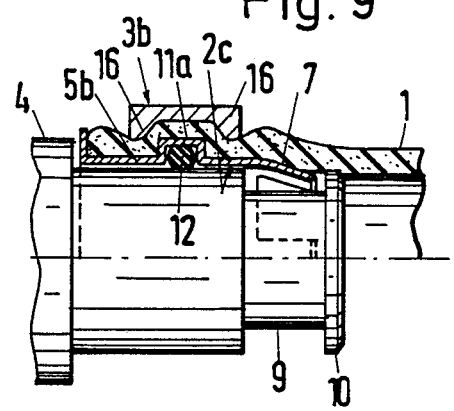
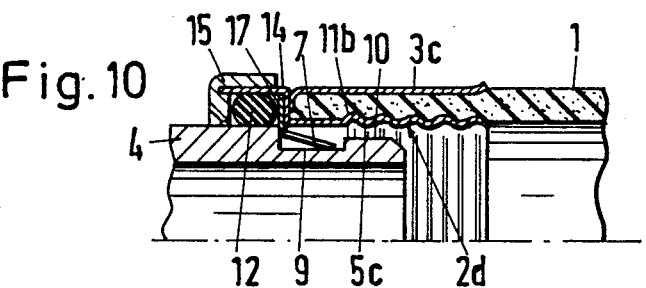
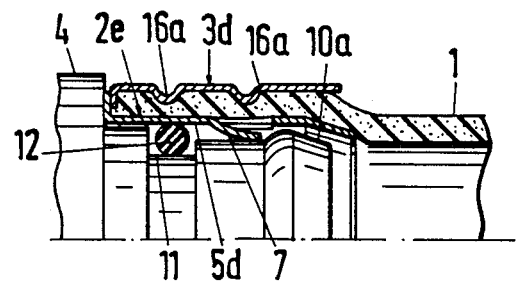
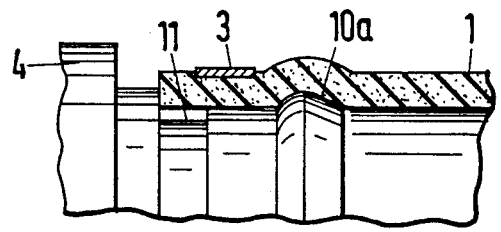

HOSE COUPLING

CROSS-REFERENCE TO RELATED CASES

The hose coupling of the present invention is similar to those which are disclosed in six commonly owned copending patent applications Ser. Nos. 345,632, 345,633, 345,636, 345,652, 345,679 and 345,680 of Heinz Sauer, all filed May 1, 1989.

BACKGROUND OF THE INVENTION

The invention relates to couplings in general, and more particularly to improvements in couplings which can be used to establish a separable fluidtight connection between an end portion of a first tubular component (e.g., a nipple at one end of a metallic or plastic pipe) and an end portion of a second tubular component (for example, one end portion of a flexible elastic hose). Such couplings can be used under the hoods of motor vehicles and for many other purposes.

Commonly owned U.S. Pat. No. 4,486,034 to Sauer discloses a hose coupling wherein a sleeve-like coupling member has a cylindrical outer portion which surrounds the end portion of a hose and a cylindrical inner portion which is surrounded by the end portion of the hose and surrounds the end portion of a pipe or another tubular component which is to be secured to the hose. The free end of the pipe has a ring-shaped retainer which is engaged by the free end of the cylindrical inner portion of the sleeve in assembled condition of the coupling to prevent extraction of the pipe from the sleeve. The sleeve includes U-shaped prongs each having an outer leg forming part of the outer portion and an inner leg forming part of the inner portion. The end portion of the hose is clamped between the legs of the U-shaped prongs. The free ends of the inner legs of the prongs bear against the retainer if the hose is pulled in a direction to move it off the end portion of the pipe or vice versa.

A drawback of the patented coupling is that the end portion of the hose can be properly clamped between the inner and outer portions of the sleeve only if the wall thickness of the end portion of the hose is within a predetermined range of wall thicknesses. If the wall thickness of the end portion of the hose is excessive, the coupling can be assembled only with the exertion of a considerable force in order to slip the sleeve onto the end portion of the pipe. Moreover, the clamping action of the sleeve upon the end portion of the hose is unpredictable and unreliable if the wall thickness of the end portion of the hose is less than the minimum value of the aforementioned range of acceptable wall thicknesses.

OBJECTS OF THE INVENTION

An object of the invention is to provide a combination of a coupling and a pipe (particularly a combination of a coupling and a nipple at one axial end of a pipe) which is constructed and assembled in such a way that the end portion of a hose or another tubular component can be reliably clamped by a sleeve of the coupling irrespective of the wall thickness of the tubular component.

Another object of the invention is to provide a coupling wherein the sleeve can be slipped onto a nipple or a like tubular part with the exertion of a relatively small force.

A further object of the invention is to provide a novel and improved method of assembling the coupling with the end portion of a hose or a like tubular component.

An additional object of the invention is to provide a novel and improved nipple for use with the above outlined coupling.

Still another object of the invention is to provide the coupling with a novel and improved sleeve-like coupling member which can perform a plurality of functions.

A further object of the invention is to provide a novel and improved fluidtight connection between a metallic or plastic nipple and the end portion of a hose or a like tubular component.

Another object of the invention is to provide the coupling with novel and improved means for releasably engaging a nipple or a like tubular part.

SUMMARY OF THE INVENTION

The invention resides in a combination of a tubular element (hereinafter called nipple) which has an external retainer (e.g., in the form of a circumferentially complete rib) with a coupling which serves to separably and fluidtightly connect the nipple to an end portion of a tubular component, particularly to an end portion of a flexible elastic hose. The coupling comprises a sleeve-like tubular coupling member including a tubular section at least a portion of which is insertable into the end portion of the tubular component (hereinafter called hose for short). The coupling member serves to receive the nipple and further includes a plurality of substantially prong-shaped coupling elements (hereinafter called prongs) which are directly or indirectly connected to the tubular section and slope toward the axis of the coupling member to engage the retainer upon introduction of the nipple into the coupling member. The coupling further comprises discrete radially contractible means for urging the end portion of the hose against the exterior of the tubular section. The inner diameter of the aforementioned portion of the tubular section is slightly greater than the outer diameter of the retainer at the exterior of the nipple. The coupling further comprises at least one annular sealing element (such as an 0-ring or a sealing element with one or more sealing lips) which is interposed between the nipple and the coupling member. The nipple and/or the coupling member has an annular groove for the sealing element.

The prongs are or can be flexible and can be made of a resilient material; they preferably extend substantially axially of the tubular section and are disposed in the end portion of the hose when the aforementioned portion of the tubular section is received in the hose.

The coupling member can be provided with at least one radially outwardly extending corrugation, and the urging means can comprise an annular (particularly tubular) clamping member which serves to surround the end portion of the hose adjacent the at least one corrugation. The coupling member has a free end (not in the hose in assembled condition of the coupling) which is axially spaced apart from the at least one corrugation. The clamping member preferably surrounds the end portion of the hose between the at least one corrugation and the free end of the coupling member.

The prongs can be integral with a radially outwardly extending corrugation of the coupling member. Such corrugation can include a substantially frustoconical portion to facilitate introduction of the tubular section into the end portion of the hose. The prongs are preferably integral with the frustoconical portion and their inclination with reference to the axis of the coupling member preferably equals or approximates the inclination of the frustoconical portion.

The urging means can comprise a clamp which is repeatedly engageable with and separable from the end portion of the hose. Alternatively, the urging means can comprise a radially deformable ductile tubular clamping member which cannot be expanded except by destruction. Irrespective of the exact design of the urging means, such urging means can be provided with one or more radially inwardly extending corrugations or beads which enhance the sealing and clamping action of the urging means.

The radially outwardly extending corrugation (or one radially outwardly extending corrugation) of the coupling member preferably defines a circumferentially complete internal groove which receives the annular sealing element. The latter is in sealing engagement with the exterior of the nipple when the nipple is inserted into the coupling member. The tubular clamping member of the urging means spacedly surrounds such corrugation so that the end portion of the hose is sealingly clamped between the clamping member and the corrugation in assembled condition of the coupling.

The coupling member can include a second section which is disposed end-to-end with or within the tubular section, and the tubular section can include a substantially radially extending annular (e.g., washer-like) wall adjacent the second section. The wall and one of the sections can define an internal annular groove for a sealing element which serves to sealingly engage the exterior of a properly inserted nipple. The inner diameter of the one section in the region of the groove is greater than the inner diameter of the major part of the tubular section, and the second section is preferably located externally of the hose in assembled condition of the coupling. Means can be provided for confining the sealing element in the groove within the one section of the coupling member; such confining means can include or constitute a ring which is affixed to the free end of the one section at the open side of the groove. The free end is axially spaced apart from the aforementioned wall between the major part of the tubular section and the groove.

If the coupling member comprises two sections, the two sections can be secured to each other by welding, by a form-locking connection or in any other suitable way, and the prongs can be integral with the second section of the coupling member.

The coupling member can be provided with substantially T-shaped or U-shaped slots, and the prongs can constitute bent portions of the coupling member within the slots. It is presently preferred to employ substantially T-shaped prongs. Each prong has a free end portion which is engageable with the retainer of the nipple, and a second portion which is remote from the free end portion and is integral with the tubular or second section of the coupling member (depending upon the design of the coupling member). The latter can be provided with pairs of notches which flank the second portions of the prongs and can enhance the flexibility and increase the effective length of the prongs.

The novel features which are considered as characteristic of the invention are set forth in particular in the appended claims. The improved combination itself, however, both as to its construction and the mode of making and assembling the same, together with additional features and advantages thereof, will be best understood upon perusal of the following detailed description of certain specific embodiments with reference to the accompanying drawing.

BRIEF DESCRIPTION OF THE DRAWING

FIG. 1 is a fragmentary axial sectional view of a combination of a nipple with a coupling which embodies one form of the invention and employs a clamp as a means for urging the end portion of the hose against the tubular section of the coupling member;

FIG. 2 is a fragmentary elevational view of the structure which is shown in FIG. 1, further showing a hood for the device which serves to tighten the clamp around the end portion of the hose;

FIG. 3 is an end elevational view of the tubular coupling member which is used in the coupling of FIG. 1;

FIG. 4 is a partly elevational and partly axial sectional view of the coupling member of FIG. 3;

FIG. 5 is a fragmentary axial sectional view of a modified coupling which can be used in conjunction with a nipple of the type shown in FIG. 1;

FIG. 6 is a side elevational view of the coupling which is shown in FIG. 5;

FIG. 7 is a fragmentary axial sectional view of a modified tubular coupling member which can be used in the coupling of FIG. 1 or FIG. 5;

FIG. 8 is a fragmentary axial sectional view of a modified nipple and of a coupling which can connect the modified nipple with the end portion of a hose;

FIG. 9 is an elevational view of a further nipple and of a coupling which can be used to connect this nipple with the end portion of a hose;

FIG. 10 is a fragmentary axial sectional view of a nipple which is similar to the nipple of FIG. 9, and a fragmentary axial sectional view of a further coupling.

FIG. 11 is a fragmentary elevational view of still another nipple and a fragmentary axial sectional view of a coupling which is used to connect the nipple to the end portion of a hose; and FIG. 12 illustrates the structure of FIG. 11 except that the permanently deformable tubular clamping member is replaced with a clamping member of the type shown in FIGS. 1 and 2.

DESCRIPTION OF PREFERRED EMBODIMENTS

FIG. 1 shows the combination of a nipple 4 with a coupling which serves to separably and fluidtightly connect the nipple with an end portion of a tubular component 1 in the form of a flexible elastic hose. The nipple 4 is connected to a container or constitutes one end of a metallic or plastic pipe.

The coupling comprises a sleeve-like tubular coupling member 2 (hereinafter called sleeve) having a tubular section 5 at least a portion of which is received in the end portion of the hose 1 in fully assembled condition of the sleeve and hose. A discrete tubular clamping member 3 is provided to urge the end portion of the hose 1 into sealing engagement with the exterior of the tubular section 5 as well as to prevent extraction of the end portion of the hose from the annular space between the clamping member and the sleeve 2. The clamping member 3 can be of the type disclosed in commonly owned U.S. Pat. No. 4,244,088 to Sauer, i.e., it can constitute a clamp which is engageable with and detachable from the end portion of the hose 1 in response to rotation of a screw which has a worm mating with a worm thread on a band extending around the hose.

As can be seen in FIGS. 3 and 4, the tubular section 5 of the sleeve 2 is provided with a radially outwardly extending corrugation 6 which serves to expand the end portion of the hose 1 inwardly adjacent the clamping member 3. The right-hand portion of the corrugation 6 has a frustoconical shape and slopes toward the axis of the sleeve 2 in a direction away from the main portion of the tubular section 5. The inclination of the frustoconical portion of the corrugation is identical with that of four flexible elastic prong-shaped coupling elements 7 (hereinafter called prongs) which slope toward the axis of the sleeve 2 in a direction toward the interior of the hose 1 when the tubular section 5 (or at least a portion of this section) is properly received in the end portion of the hose. The prongs 7 are integral with the frustoconical portion of the corrugation 6. Such configuration of the corrugation 6, combined with the aforediscussed inclination of the prongs 7, facilitates insertion of the sleeve 2 into the end portion of the hose 1. The prongs 7 are equidistant from each other in the circumferential direction of the sleeve 2.

The clamping member 3 surrounds the end portion of the hose 1 between the corrugation 6 and the outwardly flaring free end of the sleeve 2, namely that end which is located at the very end of the hose or projects from the hose in assembled condition of the coupling. FIG. 2 shows a hood 8 which surrounds and confines the tensioning element (such as a screw) for the strap or band of the clamping member 3.

The nipple 4 is provided with a circumferentially complete external annular recess 9 which is inwardly adjacent a circumferentially complete retaining rib or retainer 10. The external surface of the nipple 4 is further provided with a circumferentially complete annular groove 11 for an annular sealing element 12 (such as an 0-ring) which is deformed in response to insertion of the nipple 4 into the sleeve 2 so that the thus deformed ring is maintained in sealing engagement with the internal surface of the tubular section 5 as well as with the surface surrounding the groove 11. The sealing element 12 is spacedly surrounded by the clamping member 3. The recess 9 is disposed between the groove 11 and the retaining rib 10, and the external surface of the nipple 4 is further formed with a shoulder 13 which constitutes a stop for the coupling; this shoulder is engaged by the outwardly flaring left-hand end of the sleeve 2 when the latter properly receives the nipple. At such time, the prongs 7 are received in the recess 9 and their free ends are adjacent the radially outwardly extending left-hand flank of the retainer 10 so that the nipple 4 is held against extraction from the sleeve 2.

The inner diameter of tubular section 5 of the sleeve 2 is slightly greater than the outer diameter of the retainer 10 and of that portion of the nipple 4 which extends between the recess 9 and the shoulder 13.

The first step of establishing a fluidtight connection between the hose 1 and the nipple 4 includes insertion of the tubular section 5 with corrugation 6 and prongs 7 into the end portion of the hose. This step can be carried out prior or subsequent to placing of the clamping member 3 (in expanded condition) around the end portion of the hose 1. The clamping member 3 is then tightened around the end portion of the hose 1 and cooperates with the corrugation 6 to ensure that the end portion of the hose is maintained in sealing engagement with the external surface of the tubular section 5 and is held against any axial movement relative to the sleeve 2. The last step involves insertion of the nipple 4 into the sleeve 2. At such time, the retainer 10 advances within the tubular section 5 toward and beyond the corrugation 6 to temporarily flex the free end portions of the elastic prongs 7 radially outwardly whereupon the free end portions of the prongs enter the recess 9 due to innate resiliency of the prongs. At the same time, or shortly thereafter, the outwardly flaring left-hand end of the sleeve 2 reaches and is arrested by the shoulder 14 of the nipple 4 to thus complete the assembly of the coupling with the nipple in an axial position of the sleeve 2 in which the free end portions of prongs 7 are disposed in the recess 9 and are adjacent the left-hand flank of the retainer 10. It goes without saying that the free end portions of the prongs 7 tend to assume positions in which they are located on a circle having a diameter which is smaller than the maximum diameter of the retainer 10. This ensures that the free end portions of the prongs 7 enter the recess 9 as soon as the nipple 4 has advanced its retainer 10 beyond the sleeve 2, i.e., beyond the free end portion of the prongs.

Insertion of the nipple 4 into the sleeve 2 can be carried out by hand or mechanically, e.g., by means of a robot.

A pull upon the nipple 4 and/or upon the hose 1 in a direction to extract the nipple from the sleeve 2 results in movement of free end portions of the prongs 7 against the adjacent flank of the retainer 10 whereby the retainer cooperates with the prongs to prevent extraction of the nipple. At the same time, the clamping member 3 cooperates with the tubular section 5 and its corrugation 6 to prevent separation of the hose 1 from the sleeve 2.

If the hose 1 is to be detached from the sleeve 2, the clamping member 3 is loosened and the tubular section 5 is then readily extractable from the end portion of the hose. This exposes the prongs 7 so that the nipple 4 can be separated from the sleeve 2 by the simple expedient of flexing the prongs so that their free end portions are moved radially outwardly beyond the retainer 10. The sleeve 2 can be reused with the same nipple 4, with another nipple, with the same hose 1 or with another hose.

FIG. 4 shows that the width of each prong 7 is constant in the axial direction of the sleeve 2. A modification is shown in FIG. 4 by dotted lines. Thus, the sleeve 2 can be provided with substantially T-shaped or hammer-shaped prongs and the sleeve can be provided with pairs of notches 7' (e.g., with substantially circular notches) which flank that end portion of each prong which is remote from the free end portion. The notches 7' enhance the flexibility of the prongs in that they reduce the width of the adjacent portions of the prongs and also because they contribute to an effective lengthening of the prongs.

An advantage of the improved combination of hose coupling and nipple 4 is that the nipple can be inserted into the sleeve 2 in response to exertion of a relatively small force. All that is necessary is to overcome friction between the sealing element 12 and the internal surface of the tubular section 5 and to effect a radially outward movement of the free end portions of the prongs 7 while the retainer 10 slides along the inner sides of the prongs toward the position which is shown in FIG. 1. The reliability of sealing engagement between the end portion of the hose 1 and the tubular section 5 is not influenced by the magnitude of the just discussed force and- /or vice versa. In other words, the end portion of the hose 1 can be clamped with a great force and this does not influence the magnitude of the force which is required to insert the nipple 4 into the sleeve 2. This renders it possible to ensure that the end portion of the hose 1 is clamped with a great force (in order to ensure the establishment of a fluidtight connection between the hose and the tubular section 5 as well as to reliably prevent separation of the hose from the sleeve 2) even though a small or very small force is needed to ensure insertion of the nipple 4 into the sleeve. Still further, the clamping member 3 can readily compensate for deviations of the wall thickness of the end portion of the hose 1 from an expected or desirable wall thickness by the simple expedient of reducing the inner diameter of the clamping member to a value which ensures the establishment of a reliable connection between the internal surface of the end portion of the hose 1 and the external surface of the tubular section 5.

The provision of corrugation 6 and the placing of clamping member 3 between such corrugation and the left-hand end of the sleeve 2 further enhances the reliability of sealing and mechanical connections between the tubular section 5 and the end portion of the hose 1.

FIGS. 5 and 6 show a modified coupling which can be used with the nipple 4 of FIG. 1. The main difference between the couplings of FIGS. 1 and 5–6 is that the coupling of FIGS. 5–6 employs a permanently deformable tubular clamping member 3a which cooperates with the tubular section 5 of the sleeve 2 to sealingly engage and clamp the end portion of the hose 1. Deformation of a median portion of the clamping member 3a results in the development of substantially axially parallel creases 14' which enhance the rigidity of the deformed clamping member 3a and ensure an even more reliable retention of the end portion of the hose 1 in sealing engagement with a portion of or with the entire tubular section 5 of the sleeve 2.

The deformed clamping member 3a must be destroyed if the end portion of the hose 1 is to be detached from the sleeve 2. The latter is then ready to be attached to the same hose by means of another deformable clamping member 3a or by means of a repeatedly expandable and contractible clamping member 3.

An advantage of the clamping member 3a is that it need not comprise any radially outwardly projecting parts (such as the hood 8 of FIG. 2). This reduces the likelihood of injury to the mechanic who is in charge of inspecting or repairing the vehicle in which the combination of nipple 4 and a coupling of the type shown in FIGS. 5–6 is installed. The central corrugation of the clamping member 3a and its axially parallel creases 14' enhance the stability of the connection between the tubular section 5 of the sleeve 2 and the end portion of the hose 1.

FIG. 7 shows a portion of a modified sleeve 2a wherein the tubular section 5 and the corrugation 6 are identical with or analogous to the similarly reference parts of the sleeve 2. The prongs 7a include free end portions which extend in substantial parallelism with the axis of the sleeve 2a and second end portions which merge into and are inclined in the same way as the hollow frustoconical right-hand portion of the corrugation 6. An advantage of the prongs 7a is that their free end portions extend at right angles to the adjacent flank of the retainer 10 when the prongs 7a are received in the recess 9 of a nipple 4. The free end portions of the prongs 7a are sufficiently close to the axis of the sleeve 2a to ensure that they do not interfere with insertion of the sleeve 2a into the end portion of a hose. The same applies for the end portions of the prongs 7.

FIG. 8 shows a modified nipple 4 which is not provided with an external groove 11, and a modified coupling which serves to separably and fluidtightly connect this nipple to the end portion of hose 1. The sleeve 2b of this coupling has a tubular first section 5a which is provided with the corrugation 6 and prongs 7 and cooperates with a clamping member 3 (e.g., of the type described in connection with FIGS. 1 and 2) to sealingly engage and retain the end portion of the hose 1. The sleeve 2b further includes a second section having an inner diameter which is greater than the inner diameter of the tubular section 5a and which cooperates with a radially extending washer-like wall 14 of the sleeve 2b to define an annular groove for a modified annular sealing element 12a having one, two or more deformable sealing lips in contact with the external surface of the nipple 4. A ring-shaped confining member 15 is connected with the free axial end of the second section of the sleeve 2b to prevent escape of the sealing element 12a by way of the open end of the groove within the second section. The latter is located externally of the end portion of the hose 1. The inner diameter of the second section can equal or approximate the outer diameter of the end portion of the hose 1 (in undeformed condition of the hose), and the inner diameter of the tubular section 5a slightly exceeds the outer diameter of the retainer 10 at the exterior of the nipple 4. This retainer again resembles or constitutes a circumferentially complete retaining rib which is disposed at the free end of the nipple 4 adjacent the recess 9 for the prongs 7.

An advantage of the structure which is shown in FIG. 8 is that the external surface of the nipple 4 need not be provided with a groove 11 for the annular sealing element. The sealing element 12a can be inserted into the second section of the sleeve 2b prior to insertion of the nipple 4 or after the nipple is already received in the sleeve.

Another advantage of the combination of nipple 4 and a coupling of the type shown in FIG. 8 is that the entire coupling (inclusive of the sealing element 12a) can be assembled into a unit prior to insertion of the nipple 4 into the sleeve 2b. This is especially desirable if the connection between the hose 1 and the nipple 4 is to be established by a robot, e.g., in an automated automobile assembling plant.

The combination of FIG. 8 exhibits the additional advantage that the sealing element 12a can be readily inserted by way of the open end of the groove which is defined by the larger-diameter second section of the sleeve 2b. The sealing element 12a is reliably retained in the groove as soon as the confining ring 15 is affixed to the left-hand end of the sleeve 2b. All this can be performed before the nipple 4 is inserted into the two sections of the sleeve 2b. It has been found that the sealing element 12a can be inserted into the second section with a minimum of deformation.

The sealing elements 12 or 12a can constitute commercially available mass-produced parts.

FIG. 9 shows a coupling wherein the tubular section 5b of the sleeve 2c is provided with a radially outwardly extending corrugation 11a which defines an internal annular groove for an annular sealing element 12. At the same time, the corrugation 11a urges the material of the end portion of the hose 1 against the internal surface of the tubular clamping member 3b to prevent any axial shifting of the hose with reference to the sleeve 2c and vice versa. The two axial ends of the clamping member 3b are provided with radially inwardly extending ridges or beads 16 which flank the corrugation 11a and cooperate with the latter to even further reduce the likelihood of any axial shifting of the end portion of the hose 1 and sleeve 2c relative to each other.

The corrugation 6 is omitted, i.e., the prongs 7 are integral with the cylindrical portion of the tubular section 5b of the sleeve 2c. The nipple 4 of FIG. 9 is similar to that of FIG. 8, i.e., it need not be provided with an external groove 11.

An advantage of the coupling of FIG. 9 is that the sleeve 2c can perform several functions, namely that of engaging the retainer 10 of the nipple 4, of providing a groove for the sealing element 12 and of cooperating (by way of its radially outwardly extending corrugation 11a) with the clamping member 3b to ensure proper retention of and sealing engagement between the end portion of the hose 1 and the tubular section 5b. This renders it possible to use a clamping member 3b which need not be deformed against the external surface of the hose 1 but is merely closed to properly clamp the end portion of the hose against the tubular section 5b.

Referring to FIG. 10, there is shown a nipple 4 which is similar to the nipple of FIG. 8 or 9, and a coupling which comprises a composite sleeve 2d including a tubular section 5c and a second section 17 which is a separately produced part and is form-lockingly or otherwise connected to the section 5c. The clamping member 3c is a tube which is not or need not be provided with any corrugations and cooperates with the tubular section 5c to clamp the end portion of the hose 1. The tubular section 5c is formed with a set of corrugations 11b which bias the end portion of the hose 1 against the internal surface of the clamping member 3c.

The second section 17 of the sleeve 2d is provided with a set of equidistant prongs 7 which are located within the confines of the tubular section 5c. The radially extending shoulder-like or washer-like wall 14 of the section 5c is welded, soldered or otherwise rigidly secured to the radially extending second section 17. If the sections 5c and 17 are secured to each other by spot welding, the step of securing these sections to each other can further include rigidly connecting the wall 14 of the section 5c to the adjacent end portion of the clamping member 3c so that, with the exception of the sealing element 12 in the groove of the enlarged portion of the section 5c, the entire coupling is a one-piece body.

An advantage of the coupling of FIG. 10 is that the sections 5c and 17 can be made of two different materials. For example, the section 17 and its prongs 7 can be made of a thin resilient metallic material and the section 5c can be made of an inexpensive less resilient, non-resilient or ductile metallic or plastic material. This reduces the overall cost of the coupling and of the combination including the coupling and the nipple 4. A set of rollers or a single roller can be used to provide the tubular section 5c with corrugations 11a after the section 5c is inserted into the end portion of the hose 1.

FIG. 11 shows a nipple 4 which has an external groove 11 for an annular sealing element 12 and a modified retainer 10a having a substantially frustoconical flank which can be engaged by the free end portions of the prongs 7. The tubular section 5d of the sleeve 2e is surrounded by a tubular clamping member 3d which is made of a ductile material and is provided with two axially spaced-apart radially inwardly extending corrugations 16a flanking the region where the left-hand ends of the prongs 7 are integral with the section 5d. Each prong 7 can have a T-shaped outline and can constitute an inwardly bent portion of the tubular section 5d. To this end, the section 5d is provided with equidistant T-shaped, U-shaped or otherwise configurated slots and the material within such slots is bent inwardly to constitute the prongs 7.

The ductile clamping member 3d is destroyed if the end portion of the hose 1 is to be detached from the tubular section 5d of the sleeve 2e. This affords access to the prongs 7 whose free end portions are then flexed radially outwardly in order to permit extraction of the nipple 4 from the sleeve.

If the sleeve 2e is to be reused, e.g., if this sleeve is to be reattached to the end portion of the hose 1 or to the end portion of another hose, the destroyed clamping member 3d is replaced with a commercially available expansible and contractible clamping member 3 (note FIG. 12) of the type described in connection with FIGS. 1–2 or an equivalent thereof. The clamping member 3 is applied around the end portion of the hose 1 in the region between the retainer 10a and the left-hand axial end of the sleeve 2e.

An advantage of the combination which is shown in FIGS. 11 and 12 is that the entire sleeve 2e can be maintained in sealing engagement with the internal surface of the hose 1. This is due to the fact that the prongs 7 are bent inwardly from an intermediate portion of the tubular section 5d, i.e., they are not disposed at one axial end of the sleeve or at one axial end of a section of the sleeve. Moreover, the material of the end portion of the hose 1 can penetrate into the slots which surround the inwardly bent prongs 7 to thereby further enhance the reliability of the connection between the hose and the sleeve 2e, especially in a sense to prevent axial shifting of the hose and sleeve relative to each other.

Substantially T-shaped prongs are preferred at this time because this ensures that the free end portions of the prongs are in large-area contact with the periphery of the retainer 10 or 10a during insertion of the nipple 4 into the sleeve. This reduces the likelihood of damage to the retainer In addition, the free ends of substantially T-shaped prongs are in larger linear or surface-to-surface contact with the inner flank of the retainer 10 or 10a when the insertion of the nipple 4 into the sleeve is completed. This also reduces the likelihood of damage to the retainer and contributes to more reliable retention of the nipple in the sleeve.

The improved combination is susceptible of many additional modifications without departing from the spirit of the invention. For example, the described clamping members 3, 3a, 3b, 3c and 3d can be replaced with other types of clamping members which can be of the expansible and contractible type or which are made of a ductile material so that they must be destroyed if the sleeve is to be detached from the end portion of the hose. Thus, a clamping member can include a strap or band of elastic or ductile strip stock or a wire which can be tightened around the end portion of the hose. Furthermore, the sleeves which are shown in FIGS. 5 to 11 can be provided with T-shaped or otherwise configurated elastic prongs which are flanked by notches corresponding to the notches 7' of FIG. 4. It is also possible to replace the recess 9 of the nipple 4 shown in FIGS. 1, 8, 9, 10 and 11 with a recess which has a substantially triangular cross sectional outline with the deepmost portion of the recess adjacent the retainer 10 or 10a; this reduces the cost of making the nipple because the modified recess can be formed by removing a smaller quantity of material from the external surface of the nipple. The inclination of the bottom surface in the thus modified recess of the nipple can match or approximate the inclination of the prongs 7 or 7a.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of my contribution to the art and, therefore, such adaptations should are intended to be comprehended within the meaning and range of equivalence of the appended claims.

I claim:

1. The combination of a nipple including an external retainer having an outer diameter with a coupling for separably and fluidtightly connecting the nipple to an end portion of a tubular component, particularly to an end portion of a flexible hose, said coupling comprising a tubular coupling member having an axis and including a tubular section having a circumferentially complete portion insertable into the end portion of the tubular component, said portion of said tubular section having an inner diameter slightly greater than said outer diameter, said coupling member being arranged to receive said nipple and further including a plurality of substantially prong-shaped coupling elements located axially inwardly of said hose end and circumferentially complete portion and having a minimum diameter less than said diameters and connected to said section and sloping toward the axis of said coupling member to engage said retainer upon introduction of said nipple into said coupling member; discrete radially contractible means for urging the end portion of the tubular component against the exterior of said section; and at least one annular sealing element interposed between said nipple and said coupling member.

2. The combination of claim 1, wherein said coupling elements are elastic and flexible and extend substantially axially of said section, said coupling elements being disposed in the end portion of the tubular component upon insertion of said portion of said section into the end portion of the tubular component.

3. The combination of claim 1, wherein said coupling member has at least one radially outwardly extending annular corrugation and said urging means includes an annular clamping member which is arranged to surround the end portion of the tubular component adjacent said at least one corrugation.

4. The combination of claim 3, wherein said coupling member has a free end which is axially spaced apart from said at least one corrugation and said clamping member is arranged to surround the end portion of the tubular component between said at least one corrugation and said free end.

5. The combination of claim 1, wherein said coupling member comprises a radially outwardly extending corrugation which is integral with said coupling elements.

6. The combination of claim 5, wherein said corrugation includes a substantially frustoconical portion having a predetermined inclination with reference to the axis of said coupling member and said coupling elements are integral with and have the same inclination as said frustoconical portion 7. The combination of claim 1, wherein said urging means includes a clamp which is engageable with and separable from the end portion of the tubular component 8. The combination of claim 1, wherein said urging means comprises a radially deformable tubular clamping member.

9. The combination of claim 1, wherein said urging means comprises a tubular clamping member having at least one radially inwardly extending corrugation.

10. The combination of claim 1, wherein said coupling member has at least one radially outwardly extending corrugation defining an internal groove, said at least one annular sealing element being disposed in said groove and being arranged to sealingly engage the exterior of said nipple upon insertion of the nipple into said coupling member.

11. The combination of claim 10, wherein said urging means includes a tubular clamping member which spacedly surrounds said at least one corrugation so that the end portion of the tubular component is sealingly clamped between said at least one corrugation and said clamping member upon introduction of said portion of said section into the end portion of the tubular component.

12. The combination of claim 1, wherein said coupling member includes a second section, said tubular section having a substantially radially extending annular wall adjacent said second section, one of said sections defining an internal annular groove and said at least one annular sealing element being disposed in said groove and being arranged to sealingly engage the exterior of said nipple in response to insertion of the nipple into said coupling member.

13. The combination of claim 12, further comprising means for confining the sealing element in said groove.

14. The combination of claim 12, wherein said groove has an open side which is spaced apart from said wall in the axial direction of said coupling member, and further comprising a ring-shaped confining member connected with said one section in the region of said open side to maintain the sealing element in said groove.

15. The combination of claim 1, wherein said coupling member comprises an annular second section integral with said coupling elements and means for securing said second section to said tubular section.

16. The combination of claim 1, wherein said sealing element comprises an O-ring.

17. The combination of claim 1, wherein said coupling member has substantially T-shaped slots and said coupling elements constitute bent portions of said coupling member within said slots.

18. The combination of claim 1, wherein said coupling member has substantially U-shaped slots and said coupling elements constitute bent portions of said coupling member within said slots.

19. The combination of claim 1, wherein said coupling elements are substantially T-shaped.

20. The combination of claim 1, wherein each of said coupling elements includes a free end portion and a second portion integral with said section, said section having notches flanking the second portions of said coupling elements.

* * * * *